United States Patent [19]

Peacock

[11] Patent Number: 4,573,717
[45] Date of Patent: Mar. 4, 1986

[54] TOGGLE CLAMP

[75] Inventor: Roy N. Peacock, Lafayette, Colo.

[73] Assignee: HPS Corporation, Boulder, Colo.

[21] Appl. No.: 628,849

[22] Filed: Jul. 9, 1984

[51] Int. Cl.[4] ............................................. F16L 23/00
[52] U.S. Cl. .................................. 285/365; 285/371; 285/409; 24/270
[58] Field of Search ....... 285/365, 409, 371, 367 (U.S. only); 24/271, 270, 273

[56] References Cited

U.S. PATENT DOCUMENTS

| 889,042 | 5/1908 | Powers | 24/273 |
|---|---|---|---|
| 1,564,837 | 12/1925 | Edeborg | 24/271 |
| 1,646,463 | 10/1927 | Stokesberry | 285/409 |
| 2,133,060 | 10/1938 | Stephens | 24/71 A |
| 2,155,705 | 4/1939 | Gottwald | 24/271 |
| 2,324,356 | 7/1943 | Brown | 292/257 X |
| 2,482,374 | 9/1949 | Ruschmeyer | 24/271 |
| 2,635,900 | 4/1953 | Mayo et al. | 285/367 X |
| 2,994,934 | 8/1961 | Kraus | 24/271 |
| 3,705,737 | 12/1972 | Westerlund et al. | 24/271 X |
| 3,851,902 | 12/1974 | Robinson | 285/371 X |

FOREIGN PATENT DOCUMENTS

| 575469 | 2/1946 | United Kingdom | 24/270 |
|---|---|---|---|
| 744046 | 2/1956 | United Kingdom | 285/365 |

Primary Examiner—Thomas F. Callaghan
Attorney, Agent, or Firm—Murray, Whisenhunt & Ferguson

[57] ABSTRACT

A toggle clamp having first and second clamping members pivotally connected together for receiving objects to be clamped therebetween; a handle pivotally mounted with respect to one of the clamping members; a bail including a force generating member where the bail is so mounted with respect to the handle that upon movement of the handle from a first position to a second position, the force generating member is moved to a first position to generate a force for clamping the objects together with a first clamping force; and, a member, upon weakening or failure of the force generating means, which permits movement of the force generating member to a second position where the objects remain clamped together with a force less than that of the first clamping force whereby a fail-safe operation is provided.

11 Claims, 7 Drawing Figures

TOGGLE CLAMP

The present invention relates to an improved clamp particularly suited for clamping a flange assembly.

BACKGROUND OF THE INVENTION

Clamp devices utilizing spring biasing arrangements to provide a closing force on an object being clamped are well known. U.S. Pat. No. 2,482,374 to Ruschmeyer illustrates one such device utilizing a spring biased bolt extended through a pair of eye members mounted on opposite ends of a clamping member. Closure of the clamp compresses the spring against the bolt and urges the eye members toward each other to clamp the object.

U.S. Pat. No. 2,133,060 to Stephens relates to a closure device for pressure cookers, including a flexible band which is drawn together to seal the cover and the cooker body by a toggle arrangement consisting of a handle, a pair of pivotally connected linkage members and a spring contained in a housing formed at one end of the flexible band. Closure of the toggle arrangement compresses the spring and exerts a closing force to seal the cooker. Failure of the spring results in a shift of the flexible band equivalent to the space existing between the turns of the spring which is not sufficient to break the seal and cause loss of pressure existing within the cooker.

U.S. Pat. No. 2,324,356 to Brown discloses a clamping arrangement for use in connection with cover structures for tank truck covers, manhole covers, and the like. The clamping arrangement includes a pivotally mounted arm extending diametrically over the cover, and a closure arrangement having a biasing element for forcing the arm downwardly over the cover and exerting a pressure on the cover when in the closed position.

Other spring biased clamping arrangements are illustrated in U.S. Pat. Nos. 889,042 to Powers and 1,564,837 to Edeborg.

SUMMARY OF THE INVENTION

According to one aspect, the present invention provides a toggle clamp comprising first and second clamping means pivotally connected together for receiving objects to be clamped therebetween; a handle pivotally mounted with respect to one of the clamping means; a bail including a force generating means where the bail is so mounted with respect to the handle that upon movement of the handle from a first position to a second position, the force generating means is moved to a first position to generate a force for clamping the objects together with a first clamping force; and means, upon weakening or failure of the force generating means, for permitting movement of the force generating means to a second position where the objects remain clamped together with a force less than that of the first clamping force whereby a fail-safe operation is provided.

According to a preferred aspect of the invention, the objects to be clamped together comprise a pair of flange assemblies where each assembly includes means for accommodating a centering ring having a spacing portion having a predetermined width where the spacing portion includes means for receiving an elastic seal and where, in response to the force generating means being in its first position, the seal is compressed to the width of the spacing portion to effect a fluid tight seal and where, in response to the force generating means weakening or failing, the compression of the seal is decreased but is still sufficient to maintain the fluid tight seal.

According to another preferred aspect of the invention, the clamping force generating means comprises a T-shaped member, the cross-piece of which is engageable with the other of the clamping means, and a biasing means in biasing engagement with the T-shaped member for urging the T-shaped member towards the first clamping position. Preferably, the bail includes spaced-apart side walls defining opposed elongate slots, and the cross-piece of the T-shaped member is mounted for reciprocal movement in those slots, with the extent of reciprocal movement being defined by the length of the slots.

According to another preferred aspect of the invention, the toggle means includes a locking means for locking the handle and bail together to prevent relative movement therebetween when the toggle means is in its closed clamping position.

BRIEF DESCRIPTION ON THE DRAWINGS

The invention will now be described with reference to the accompanying drawings, in which.

DETAILED DESCRIPTION OF THE INVENTION

Figure 1:
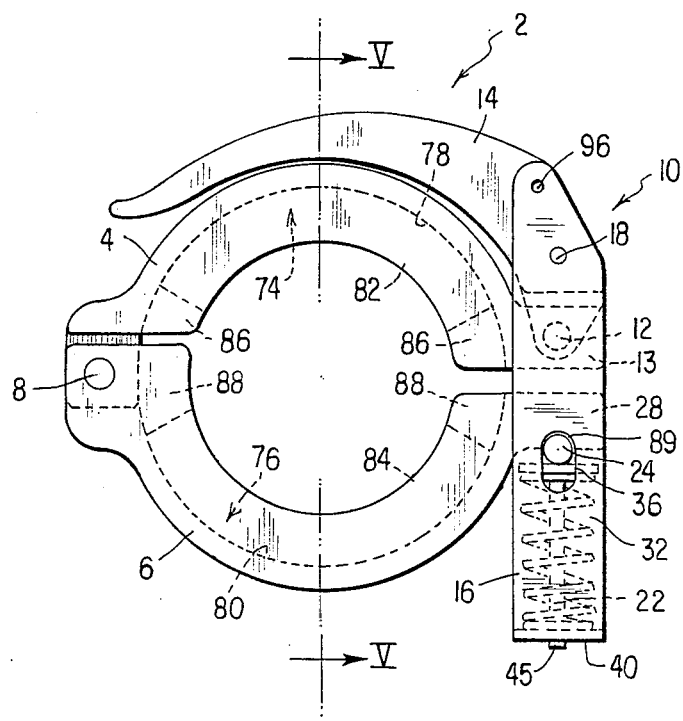
FIG. 1 is a side elevation of the clamp of the invention with the toggle means in a closed configuration.
Figure 2:
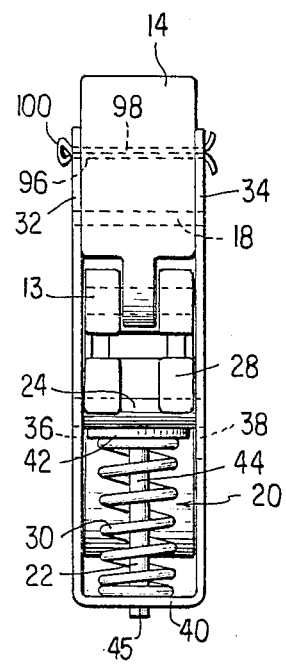
FIG. 2 is an end elevation of the clamp of FIG. 1.

Referring to FIGS. 1 and 2, the clamp of the invention, generally referenced 2, includes first and second clamping means 4,6 hingedly connected together at hinge point 8. A toggle means, generally referenced 10, is pivotally connected to the first clamping means 4 at pivot point 12 in end portion 13 of clamping means 4, and includes a handle 14 and a bail 16 pivotally mounted to the handle 14 at pivot point 18. The bail 16 includes a clamping force generating means, generally referenced 20, comprising a T-shaped member 22 having a cross piece 24 which is engageable in a recess 26 formed in end portion 28 of the clamping means 6. The clamping force generating means 20 also includes a biasing means which in the drawings is illustrated as comprising a compression spring 30, although it will be appreciated that any resilient biasing means may be employed, and this is not limited to a compression spring.

Alternatively, although not shown, other arrangements of the toggle mechanism are within the scope of the present invention. Thus, for example, the relative positions of pivot point 18 and recess 26 may be changed such that the pivot point for bail 16 is on end portion 28 of clamping means 6 while the recess 26 is on the outer periphery of handle 14.

As can be seen from FIGS. 1 and 2, the bail 16 includes spaced-apart side walls 32,34 defining therein opposed elongate slots 36,38 and the cross-piece 24 of the T-shaped member 22 is mounted for reciprocal movement in those slots. The bail 16 also includes a base member 40 extending between the side walls 32,34, and this serves to support the compression spring 30. A centralizing means 42 is mounted on the underside of the cross-piece 24 for maintaining the T-shaped member 22 centrally disposed within the compression spring 30, and the compression spring abuts against the centralizing means 42. As can be clearly seen from FIG. 2, the central member 44 of the T-shaped member extends through an aperture 45 in base member 40 and this maintains the T-shaped member 22 centrally disposed within the bail 16. The centralizing means 42 and the central member 44 also serve to retain the compression spring within the bail, and thereby prevent the spring from becoming disengaged from the bail.

Figure 3:
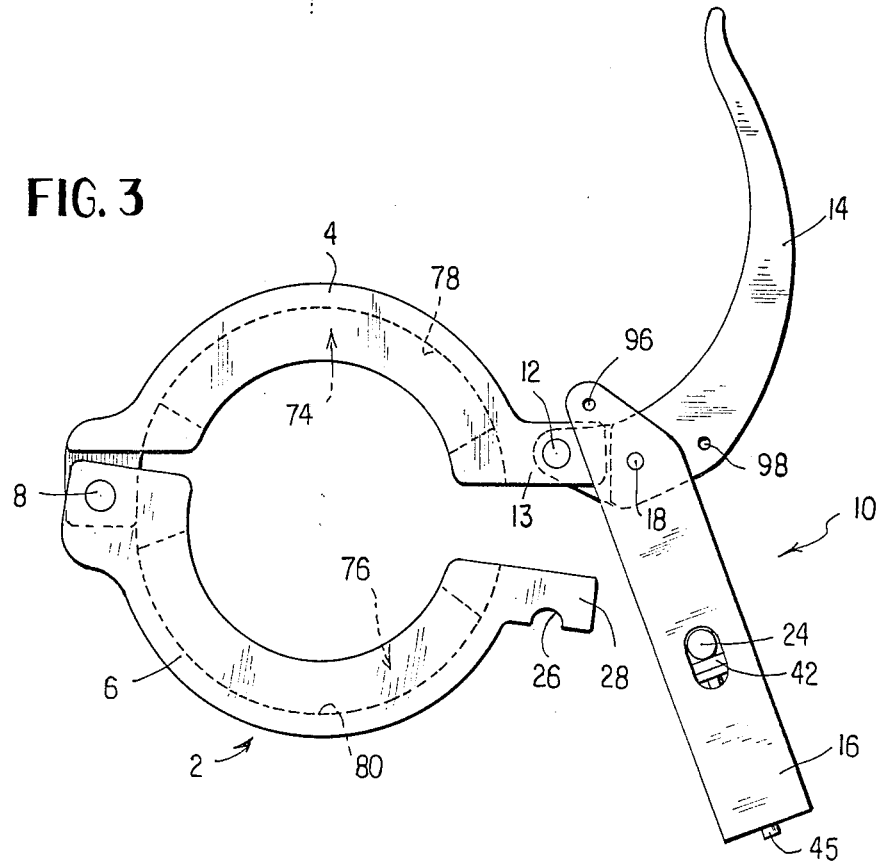
FIG. 3 is a side elevation of the clamp of FIG. 1 showing the toggle means in a disengaged configuration.

Referring to FIG. 3, disengagement of the clamping force generating means 20 from the second clamping means 6 is achieved by pivoting the handle 14 about pivot point 12 from left to right as seen in FIG. 3. When this is done, the bail is initially moved to the right as a result of pivotal movement about pivot point 18, and that is followed by downward movement of the bail as the handle 14 approaches the position shown in FIG. 3 where pivot points 12 and 18 are approximately laterally disposed with respect to each other. In this position, the bail has moved downwardly with respect to the second clamping means 6 by sufficient distance to allow the cross piece 24 to become disengaged from the recess 26, and permit free pivotal movement of the bail 16 about pivot point 18. The clamping means 4,6 can then be freely moved with respect to each other about hinge point 8, and this facilitates introduction or removal of an object to be clamped, as discussed in more detail below.

Figure 4:
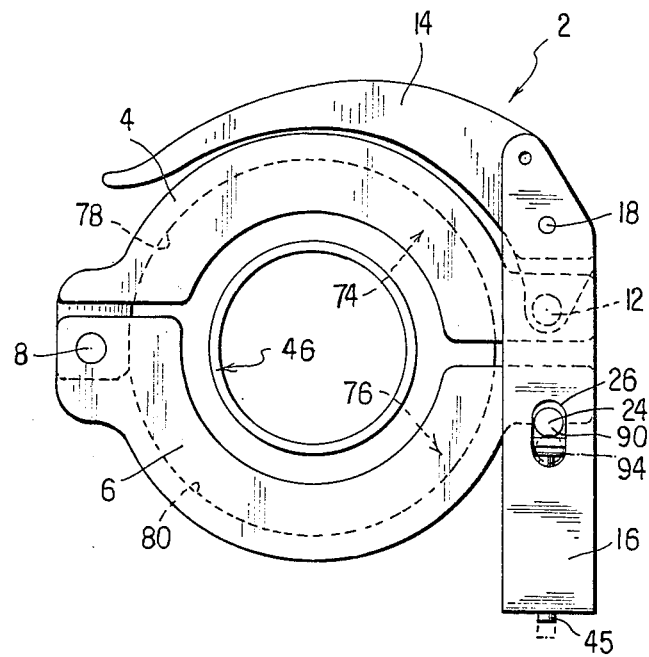
FIG. 4 is a side elevation of the clamp of the invention showing a flange in clamped engagement with the clamp.
Figure 6:
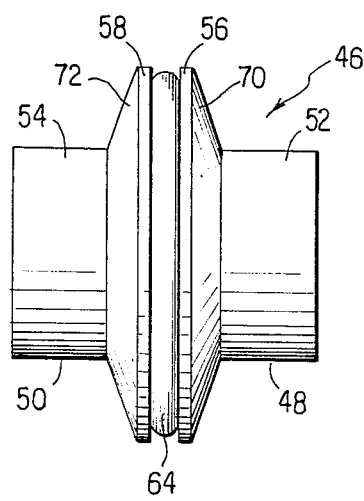
FIG. 6 is a front elevation of the flange shown in FIG. 4.
Figure 7:
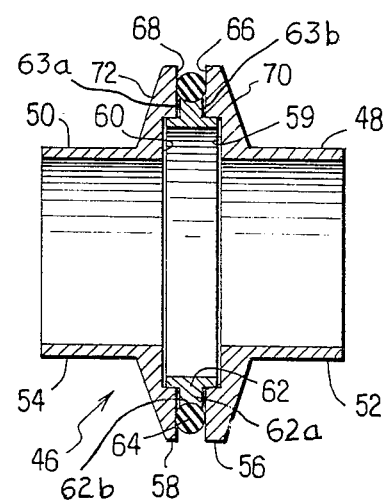
FIG. 7 is a cross-sectional elevation of the flange assembly of FIG. 6.

In FIG. 4, an illustrative flange assembly 46 is shown in clamped engagement with the clamp 2. The flange assembly 46 is shown in more detail in FIGS. 6 and 7, and includes a pair of side members 48,50 having a cylindrical portion 52,54 and a flange portion 56,58 of larger diameter than the respective cylindrical portions. Each side member 48,50 has a cylindrical recess 59,60 shown in FIG. 7 which houses a centering ring 62 which may include a spacing portion 62a having vertical side walls 63a and 63b and a groove 62b for supporting an elastic sealing ring 64. As shown in FIG. 7, sealing ring 64 is supported on the centering ring 62, and is sandwiched between inner faces 66,68 of the flange portions 56,58. Each side member 48,50 may have a frusto-conical surface extending between the cylindrical portion 52,54 and the flange portion 56,58, and those frusto-conical surfaces 70,72 are receivable for clamping engagement within the clamping means 4,6, as discussed in detail below. It should be understood the above flange assembly is but typical and numerous other types of such assemblies may be used in accordance with the invention.

Figure 5:
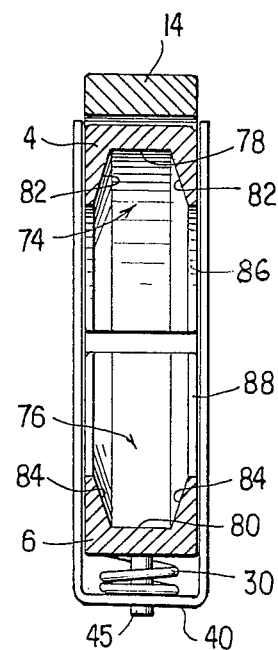
FIG. 5 is a cross-sectional elevation taken along the line of V—V shown in FIG. 1.

Referring to FIGS. 4 and 5, illustrative clamping means 4,6 are shown which may include an arcuate internal clamping surface 74,76 having a base surface 78,80 and inclined clamping surfaces 82,84 which are clampingly engageable with the frusto-conical surfaces 70,72 of the flange. As will be seen from FIG. 5, the clamping means 4,6 are each essentially U-shaped in cross section, and the side walls on either side of the internal clamping surfaces 74,76 are thinner in cross-section and define inclined surfaces 86,88 on either side of the inclined clamping surfaces 82,84. As a result the primary clamping force on the flange assembly is exerted by the internal clamping surfaces 82,84. Again, it should be understood the above clamping means are but illustrative and numerous details of the illustrative clamping means may be varied in accordance with the invention.

In use, the flange assembly 46 is inserted into the clamping means 4, and the clamping means 6 is closed around the flange assembly, followed by pivoting the bail 16 about pivot point 18 into overlapping engagement with the end portion 28 of clamping means 6 so that the cross piece 24 is aligned with recess 26. The handle 14 is then rotated from right to left towards its closed position as shown in FIG. 4, and this results in the cross-piece 24 engaging with the recess 26. As the handle 14 is closed, the clamping means 4 and 6 are urged towards each other into clamping engagement about the flange assembly 46, and the cross-piece 24 is urged, against the biasing force of the compression spring 30, along the elongate slots 36,38 from the position 89 shown in FIG. 1 where the cross-piece is in abutting engagement with the ends of the elongate slots 36,38 to a first clamping position 90 as shown in FIG. 4. In this closed configuration, the inclined clamping surfaces 82,84 press against the frusto-conical surfaces 70,72 and urge the side members 48,50 towards each other to compress the sealing ring 64 and generate a fluid tight seal.

In the event of failure or weakening of the compression spring 30 while the clamp is in the closed clamping position (as shown in FIG. 4), the cross-piece 24 of the T-shaped member 22 moves along the elongate slots 36,38 from the first clamping position 90 towards a second clamping position 94 shown in dotted relief in FIG. 4. When this occurs, end portions 13,28 of clamping means 4 and 6 move away from each other and the compressive force on the flange portions 56,58 is reduced allowing the side members 48,50 to move axially away from each other in view of the expansive force of the compressed resilient sealing ring 64. However, the extent to which the side members 48,50 become axially displaced from each other upon movement of the T-shaped member from the first clamping position to the second clamping position is not sufficient to break the fluid tight seal between the side members 48,50 and the sealing ring 64. This is despite the reduced clamping force being exerted on the frusto-conical surfaces 70,72 by the clamping means 4,6 when the T-shaped member 22 is in the second clamping position 94. Thus, the elongate slots 36,38 are positioned so that the sealing ring 64 is partially compressed to maintain the seal even when the spring 30 has failed or weakened sufficiently to permit movement of the T-shaped member 22 from the first clamping position 90 to the second clamping position 94.

Arrangements other than the movement of T-shaped member 22 in elongate slots 36,38 may also be employed to establish the first and second clamping positions. Thus, for example, the slots 36,38 may be eliminated where the width of cross-piece 24 would be less than the distance between the inner surfaces of side walls 32,34. In place of the eliminated slots would be a reduced diameter portion having upper and lower shoulders on the central member 44 where the reduced diameter portion would be disposed within aperture 45. The diameter of aperture 45 would, of course, be greater than that of the reduced diameter portion but less than the diameter of the remainder of central member 45.

Thus, in the first clamping position, the lower shoulder of the reduced diameter portion would engage or be near base member 40 while in the second clamping position, the upper shoulder would engage the base member.

As a safety feature, the clamp 2 has a locking means provided in the toggle means 10 for locking the toggle means in its closed position as shown in FIGS. 1 and 4. The locking means includes apertures 96,98 extending through the the bail 16 and the handle 14 respectively which come into axial alignment when the toggle means is is in its closed position, and a split pin or cotter pin 100 receivable through the apertures 96,98, as shown in FIG. 2. When the pin 100 is in place, the handle cannot be moved from its position shown in FIG. 1, so that accidental or unwanted opening of the clamp is avoided.

From the above, it will be clear that the clamp of the present invention enjoys several advantages over prior known clamps which make it a useful advance over the art. In particular, the clamp embodies a simple and inexpensive toggle arrangement including a clamping force generating means which maintains a clamping force on the objects being clamped even in the event of failure or weakening of the biasing means. Since springs or other biasing means are always subject to fatigue failure, which in turn can result in loss of work in progress, this is a most valuable feature. The clamp is especially adapted for use in clamping flange assemblies, in which the clamp in its closed position generates a fluid tight seal which is maintained in the event the spring weakens or fails. Of course, such an arrangement also avoids the situation where the clamp fails entirely permitting potentially damaging leakage at the flanges. Furthermore, with the present arrangement, a simple spring such as compression 30 may be employed to effect the toggle clamp of the present invention within acceptable tolerances without resorting to more expensive, intricate leaf-type springs that characterize certain toggle clamps of the prior art.

It is also to be noted that the toggle means is pivotally mounted to only one of the clamping means so that, in its open position, the toggle arrangement can be moved out of the way and the second clamping means is freely movable, which facilitates easy engagement and disengagement of the flange with the clamp. Furthermore, the movability of the clamping force generating means between the first and second clamping positions provides increased tolerance flexibility with respect to size variations in the various parts of flange assemblies. The clamping force generating means is thus capable of providing a closing clamping force over the full range of flange assembly tolerances.

It will be understood that the invention as described above may be modified without departing from the principles thereof as has been outlines and explained in this specification. The present invention should be understood as encompassing all such modifications as are within the spirit and scope of the following claims.

What is claimed is:

1. A toggle clamp comprising:
   first and second clamping means pivotally connected together for receiving objects to be clamped therebetween;
   a handle pivotally mounted with respect to one of said clamping means;
   a bail including a force generating means where the bail is so mounted with respect to the handle that upon movement of the handle from a first position to a second position, the force generating means is moved to a first position to generate a force for clamping the objects together with a first clamping force; and
   means, upon weakening or failure of the force generating means, for permitting movement of the force generating means to a second position where the objects remain clamped together with a force less than that of the first clamping force
   whereby a fail-safe operation is provided.

2. A toggle clamp as in claim 1 where said objects to be clamped together comprise a pair of flange assemblies where each assembly includes means for accommodating a centering ring having a spacing portion having a predetermined width where the spacing portion includes means for receiving an elastic seal and where, in response to said force generating means being in its first position, the seal is compressed to the width of the spacing portion to effect a fluid tight seal and where, in response to the force generating means weakening or failing, the compression of the seal is decreased but is still sufficient to maintain said fluid tight seal.

3. A toggle clamp as in claim 1 or 2, where said force generating means comprises a T-shaped member, the cross-piece of which is engagable with the other of said clamping means, and biasing means in biasing engagement with said T-shaped member for urging said T-shaped member towards said first clamping position.

4. A toggle clamp as in claim 3 including first and second stop means where said T-shaped member is reciprocally moveable between said first and second stop means as the force generating means is moved between its first and second positions.

5. A toggle clamp according to claim 4, wherein said bail includes spaced-apart side walls defining therein opposed elongate slots, where one of the respective extremeties of said slots correspond to said second stop means, said cross-piece of said T-shaped member being reciprocally movable in said slots between said first and second positions of the force generating means.

6. A toggle clamp as in claim 1 or 2, where said first and second clamping means each comprises an arcuate clamping member of essentially U-shaped cross-section having an inner base surface and internal clamping surfaces extending away from said base surface, said clamping surfaces being clampingly engageable with surfaces provided on the objects to be clamped.

7. A toggle clamp as in claim 6 where said internal clamping surfaces are inclined outwardly from said inner base surface and where the engaged surfaces of the objects to be clamped are correspondingly inclined.

8. A toggle clamp as in claim 7, wherein said objects to be clamped are each a flange having a pair of side members, each of said side members having a flange portion provided with flange inclined surfaces, and a sealing member locatable between said flange portions, said internal inclined clamping surfaces of said clamping members being engageable with said flange inclined surfaces to urge said flange portions towards each other and into fluid tight sealing engagement with said sealing member upon movement of said clamping force generating means towards said first clamping position, movement of said clamping force generating means, upon weakening or failure of the force generating means, from said first clamping position to said second clamping position maintaining said flange portions and said sealing member in fluid tight engagement with each other.

9. A toggle clamp as in claim 1 or 2, where said handle includes locking means for locking said handle in said second position.

10. A toggle clamp as in claim 9, wherein said locking means includes an aperture extending through said bail and said handle and a split pin receivable in said aperture for preventing relative movement between said bail and said handle.

11. A toggle clamp as in claim 1 or 2 where said bail is pivotally mounted on said handle and said force generating means exerts its force on the other of said clamping means.

* * * * *